(12) United States Patent
Tsubota et al.

(10) Patent No.: US 12,084,745 B2
(45) Date of Patent: *Sep. 10, 2024

(54) COPPER ALLOY POWDER, METHOD OF PRODUCING ADDITIVELY-MANUFACTURED ARTICLE, AND ADDITIVELY-MANUFACTURED ARTICLE

(71) Applicants: DAIHEN CORPORATION, Osaka (JP); Osaka Research Institute of Industrial Science and Technology, Izumi (JP)

(72) Inventors: Ryusuke Tsubota, Osaka (JP); Yohei Oka, Osaka (JP); Akira Okamoto, Osaka (JP); Takayuki Nakamoto, Izumi (JP); Takahiro Sugahara, Izumi (JP); Naruaki Shinomiya, Izumi (JP); Mamoru Takemura, Izumi (JP); Sohei Uchida, Izumi (JP)

(73) Assignees: DAIHEN CORPORATION, Osaka (JP); Osaka Research Institute of Industrial Science and Technology, Izumi (JP)

( * ) Notice: Subject to any disclaimer, the term of this patent is extended or adjusted under 35 U.S.C. 154(b) by 392 days.

This patent is subject to a terminal disclaimer.

(21) Appl. No.: 17/192,125

(22) Filed: Mar. 4, 2021

(65) Prior Publication Data

US 2021/0187614 A1 Jun. 24, 2021

Related U.S. Application Data

(62) Division of application No. 15/791,675, filed on Oct. 24, 2017, now Pat. No. 10,981,226.

(30) Foreign Application Priority Data

Oct. 25, 2016 (JP) .................................. 2016-208895
Jun. 6, 2017 (JP) .................................. 2017-111709
Oct. 3, 2017 (JP) .................................. 2017-193374

(51) Int. Cl.
*C22C 1/04* (2023.01)
*B22F 3/24* (2006.01)
(Continued)

(52) U.S. Cl.
CPC .............. *C22C 1/0425* (2013.01); *B22F 3/24* (2013.01); *B22F 10/00* (2021.01); *B22F 10/28* (2021.01);
(Continued)

(58) Field of Classification Search
CPC . C22C 1/0425; C22C 9/00; C22C 9/06; B22F 3/24; B22F 10/00; B22F 10/28;
(Continued)

(56) References Cited

U.S. PATENT DOCUMENTS 3,428,442 A 2/1969 Yurasko, Jr.
4,755,235 A 7/1988 Matidori et al.
(Continued)

FOREIGN PATENT DOCUMENTS

CN 86104601 A 1/1988
CN 101140977 A 3/2008
(Continued)

OTHER PUBLICATIONS

Xiao et al., "Preparation and Characterization of Cu—Cr Alloy Powders," Advanced Materials Research, vol. 571, published online Sep. 29, 2012, pp. 60-64 (Year: 2012).*
(Continued)

*Primary Examiner* — John A Hevey
(74) *Attorney, Agent, or Firm* — Sughrue Mion, PLLC

(57) ABSTRACT

A copper alloy powder is a copper alloy powder for additive manufacturing. The copper alloy powder contains more than 1.00 mass % and not more than 2.80 mass % of chromium,
(Continued)

and a balance of copper. A method for producing an additively-manufactured article includes a first step of preparing a copper alloy powder containing more than 1.00 mass % and not more than 2.80 mass % of chromium and a balance of copper and a second step of producing the additively-manufactured article from the copper alloy powder, and the additively-manufactured article is produced such that forming a powder layer including the copper alloy powder, and solidifying the copper alloy powder at a predetermined position in the powder layer to form a shaped layer are sequentially repeated to stack such shaped layers to thus produce the additively-manufactured article.

6 Claims, 11 Drawing Sheets

(51) Int. Cl.
| | |
|---|---|
| *B22F 10/00* | (2021.01) |
| *B22F 10/25* | (2021.01) |
| *B22F 10/28* | (2021.01) |
| *B22F 10/32* | (2021.01) |
| *B22F 10/36* | (2021.01) |
| *B22F 10/64* | (2021.01) |
| *B33Y 10/00* | (2015.01) |
| *B33Y 70/00* | (2020.01) |
| *C22C 9/00* | (2006.01) |
| *C22C 9/06* | (2006.01) |
| *C22F 1/08* | (2006.01) |
| *B22F 10/80* | (2021.01) |
| *B22F 12/41* | (2021.01) |
| *B22F 12/67* | (2021.01) |
| *B33Y 80/00* | (2015.01) |

(52) U.S. Cl.
CPC .............. *B22F 10/64* (2021.01); *B33Y 70/00* (2014.12); *C22C 9/00* (2013.01); *C22C 9/06* (2013.01); *C22F 1/08* (2013.01); *B22F 2003/248* (2013.01); *B22F 10/25* (2021.01); *B22F 10/32* (2021.01); *B22F 10/36* (2021.01); *B22F 10/80* (2021.01); *B22F 12/41* (2021.01); *B22F 12/67* (2021.01); *B22F 2998/10* (2013.01); *B33Y 10/00* (2014.12); *B33Y 80/00* (2014.12); *Y02P 10/25* (2015.11)

(58) Field of Classification Search
CPC .......... B22F 10/64; B22F 10/25; B22F 10/32; B22F 10/36; B22F 10/80; B22F 12/41; B22F 12/67; B22F 2003/248; B22F 2998/10; B22F 1/0003; B33Y 70/00; B33Y 10/00; B33Y 80/00; C22F 1/08; Y02P 10/25

See application file for complete search history.

(56) References Cited

U.S. PATENT DOCUMENTS

| | | | |
|---|---|---|---|
| 5,292,477 | A | 3/1994 | Chance et al. |
| 5,352,404 | A | 10/1994 | Yoshioka et al. |
| 5,480,472 | A | 1/1996 | Noda et al. |
| 10,843,260 | B2 * | 11/2020 | Tsubota .............. C22C 9/00 |
| 10,981,226 | B2 * | 4/2021 | Tsubota .............. B22F 10/00 |
| 11,077,495 | B2 * | 8/2021 | Tsubota .............. B33Y 70/00 |
| 2002/0041818 | A1 | 4/2002 | Abe et al. |
| 2004/0045641 | A1 | 3/2004 | Kawasaki et al. |
| 2004/0213692 | A1 | 10/2004 | Ishijima |
| 2006/0086437 | A1 | 4/2006 | Nippert et al. |
| 2006/0239853 | A1 | 10/2006 | Maehara et al. |
| 2007/0286958 | A1 * | 12/2007 | Slaughter .............. B33Y 40/20 427/532 |
| 2008/0061315 | A1 | 3/2008 | Hata |
| 2009/0053090 | A1 | 2/2009 | Terao |
| 2010/0034982 | A1 | 2/2010 | Fuwa |
| 2010/0326573 | A1 | 12/2010 | Mihara et al. |
| 2011/0056591 | A1 | 3/2011 | Kondoh et al. |
| 2013/0143066 | A1 | 6/2013 | Hirano et al. |
| 2014/0154088 | A1 | 6/2014 | Etter et al. |
| 2015/0125334 | A1 | 5/2015 | Uetani et al. |
| 2015/0273631 | A1 | 10/2015 | Kenney et al. |
| 2016/0212836 | A1 | 7/2016 | Arai et al. |
| 2016/0332227 | A1 | 11/2016 | Tsubota et al. |
| 2017/0320134 | A1 | 11/2017 | Tsubota et al. |
| 2017/0333987 | A1 | 11/2017 | Tsubota et al. |

FOREIGN PATENT DOCUMENTS

| | | | |
|---|---|---|---|
| CN | 101815799 | A | 8/2010 |
| CN | 101896629 | A | 11/2010 |
| CN | 103097580 | A | 5/2013 |
| CN | 103146948 | A | 6/2013 |
| CN | 102912342 | B | 5/2014 |
| CN | 104404509 | A | 3/2015 |
| CN | 104475745 | A | 4/2015 |
| CN | 104755197 | A | 7/2015 |
| CN | 105132734 | A | 12/2015 |
| EP | 0 469 578 | A2 | 2/1992 |
| EP | 1361288 | A1 | 11/2003 |
| JP | 44-27126 | B | 11/1969 |
| JP | S47-1685 | B1 | 1/1972 |
| JP | S60-50161 | A | 3/1985 |
| JP | 61-163223 | A | 7/1986 |
| JP | H04-95318 | A | 3/1992 |
| JP | H04-154018 | A | 5/1992 |
| JP | H05-20491 | B2 | 3/1993 |
| JP | H05-217473 | A | 8/1993 |
| JP | H09-324203 | A | 12/1997 |
| JP | H10-88201 | A | 4/1998 |
| JP | 11-229057 | A | 8/1999 |
| JP | 2000300129 | A | 10/2000 |
| JP | 2002-115004 | A | 4/2002 |
| JP | 2002-249804 | A | 9/2002 |
| JP | 2004-323953 | A | 11/2004 |
| JP | 2005314806 | A | 11/2005 |
| JP | 2005330583 | A | 12/2005 |
| JP | 4114922 | B2 | 7/2008 |
| JP | 4213134 | B2 * | 1/2009 | .............. C22C 1/04 |
| JP | 2010-13726 | A | 1/2010 |
| JP | 2011-21218 | A | 2/2011 |
| JP | 2014129597 | A | 7/2014 |
| JP | 2016-53198 | A | 4/2016 |
| JP | 6030186 | B1 | 11/2016 |
| KR | 10-2010-0096111 | A | 9/2010 |
| WO | 02092264 | A1 | 11/2002 |
| WO | 2009084645 | A1 | 7/2009 |
| WO | 2015/030209 | A1 | 3/2015 |

OTHER PUBLICATIONS

JP4213134b2, Hideaki et al., machine translation. (Year: 2005).*
Notice of Allowance dated Jan. 4, 2022 from the Korean Intellectual Property Office in KR application No. 10-2020-7030628.
Purpose of revocation request dated Aug. 5, 2021 from the Korean Patent Office in KR Patent Registration No. 10-2203423.
Communication dated Feb. 16, 2021, from the Indian Intellectual Property Office in Application No. 201917019927.
"Gas Atomization Powder for Additive Manufacturing", Sanyo Technical Report, vol. 22 (2015) No. 1, pp. 62-64 (4 pages total).
"Selektives Laserschmelzen von Kupfer und Kupferlegierungen", ("Selective Laser Melting of Copper and Copper Alloys", David Becker, Apprimus Verlag, Aachen; ISBN 978-3-86359-217-2), published Jul. 23, 1986 (76 pages total).
"Werkstoffdatenblatt Hovadur CCZ", ("Material data sheet for the material Hovadur CCZ", Schmelzmetall), Aug. 1, 2014 (2 pages total).

(56) References Cited

OTHER PUBLICATIONS

Christian Lehnert et al., "Recent trend in production of high quality, spherical metal powder particles using inert gas atomization equipment", The Special Steel, vol. 65, No. 4, Jul. 1, 2016, p. 65 (2 pages total).
Communication dated Jun. 29, 2017, from Japanese Patent Office in counterpart application No. 2017-700495 for Notice of Opposition Against Patent dated May 18, 2017.
Communication dated Jun. 29, 2017, from Japanese Patent Office in application No. 2017-700495 for Notice of Opposition Against Patent dated May 24, 2017.
Communication dated Mar. 1, 2016, issued from the State Intellectual Property Office of People's Republic of China in Application No. 201610319718.6.
Communication dated Mar. 12, 2019 from Japanese Patent Office in application No. 2016-185949.
Communication dated Oct. 4, 2016, issued by the European Patent Office in European Application No. 16169139.9.
Decision to Grant Patent dated May 26, 2020, from the Japanese Patent Office in Application No. 2016-185949.
Communication dated Sep. 11, 2020, issued by the Korean Intellectual Property Office in application No. 10-2019-7014723.
Communication dated Sep. 26, 2017 from the Japanese Patent Office in counterpart application No. 2017-111709.
International Search Report dated Aug. 2, 2016 from the International Bureau in counterpart International Application No. PCT/JP2016/063712.
Non-Final Office Action issued in U.S. Appl. No. 15/657,300, dated May 23, 2018.
Notice of Preliminary Rejection issued Jul. 17, 2019 in Korean Patent Application No. 10-2017-7035151 with English translation.
D.Q. Zhang et al., "Investigation on forming process of copper alloys via Selective Laser Melting", High Value Manufacturing—Bartolo et al. (Eds), C2014 Taylor & Francis Group, London, ISBN 978-1-138-00137-4, pp. 285-289. (Ev. 1).
Deutsches Kupferinstitut CuCr1Zr, ("Data sheet of the German Copper Institute regarding CuCr1Zr"), 2005 (9 pages total).
Extended European Search Report dated Apr. 4, 2018 issued by the European Patent Office in counterpart application No. 17198275.4.
First Office Action issued May 8, 2019 in Chinese Patent Application No. 201711001476.7 with English translation.
Furukawa Electric; Alloy Type: Copper and Copper Alloy Products, May 18, 2018.
Japanese Notice of Opposition mailed Apr. 11, 2019, Opposition No. 2017-200187 (U.S. Pat. No. 6,389,557) with English translation.
Miyakawa et al., "Producing Cu—Cr Alloy by Selective Laser Melting," Abstract of Spring Meeting of Japan Society of Powder and Powder Metallurgy, 2015, p. 75. (4 pages total).
Nomura et al., "Microstructure and mechanical properties of a Cu alloy fabricated by selective laser melting process," Current Advances in Materials and Processes, vol. 28, No. 2, 2015, p. 180. (5 pages total).
Notice of Opposition dated Dec. 8, 2020 in European Patent No. 3315229 B1.
Office Action issued Apr. 18, 2018 in U.S. Appl. No. 15/151,693.
Office Action issued Aug. 1, 2019 in U.S. Appl. No. 15/151,693.
Office Action dated Aug. 6, 2020 issued in U.S. Appl. No. 15/657,348.
Office Action issued Dec. 2, 2016 in Taiwanese Application No. 105114761.
Office Action issued Aug. 2, 2017 in U.S. Appl. No. 15/151,693.
Office Action issued Aug. 7, 2019 in U.S. Appl. No. 15/657,348.
Office Action issued Dec. 19, 2019 in U.S. Appl. No. 15/151,693.
Office Action issued Feb. 11, 2019 in U.S. Appl. No. 15/151,693.
Office Action issued Jan. 3, 2020 in U.S. Appl. No. 15/657,348.
Office Action issued Mar. 26, 2020 in U.S. Appl. No. 15/151,693.
Office Action issued Mar. 7, 2019 in U.S. Appl. No. 15/657,348.
Office Action issued May 24, 2018 in U.S. Appl. No. 15/657,348.
Office Action issued Nov. 10, 2020 in Taiwanese Application No. 107139042.
Office Action issued Nov. 11, 2020 in Taiwanese Application No. 107139043.
Office Action issued Nov. 15, 2017 in U.S. Appl. No. 15/151,693.
Office Action issued Nov. 3, 2020 in U.S. Appl. No. 15/657,348.
Office Action issued Oct. 9, 2018 in U.S. Appl. No. 15/657,300.
Office Action issued Oct. 9, 2018 in U.S. Appl. No. 15/657,348.
Office Action issued Sep. 28, 2018 in U.S. Appl. No. 15/151,693.
Popovich et al., "Microstructure and mechanical properties of additive manufactured copper alloy", Materials Letters, vol. 179, May 9, 2016, pp. 38-41, XP029562455 (4 pages total).
Tetsuji Kuse, "Introduction of 3D printer "EOS M280"", Sanyo Technical Report, vol. 23 (2016) No. 1, pp. 31-33 (4 pages total).
Wieland-K60 Datenblatt zu CuCr1Zr, ("Material data sheet for the material Wieland-K60", Wieland-Werke AG), 2014 (2 pages total).

* cited by examiner

FIG.4
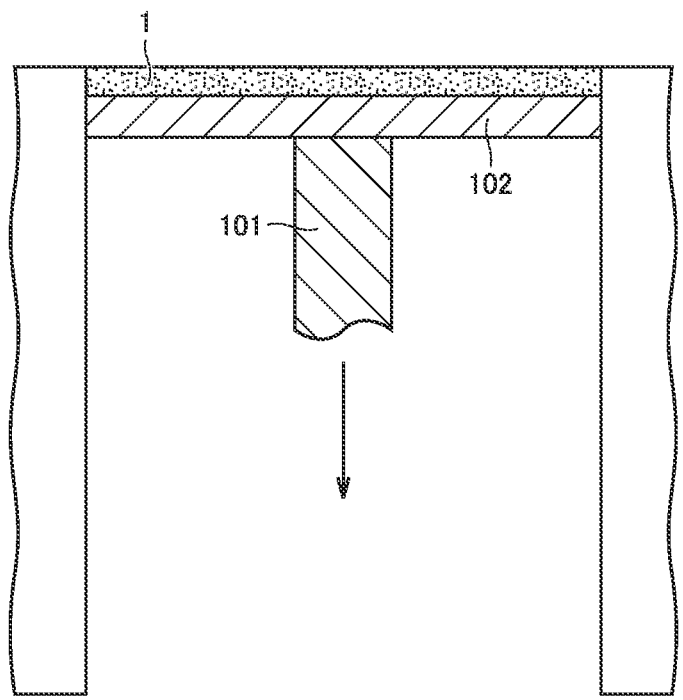

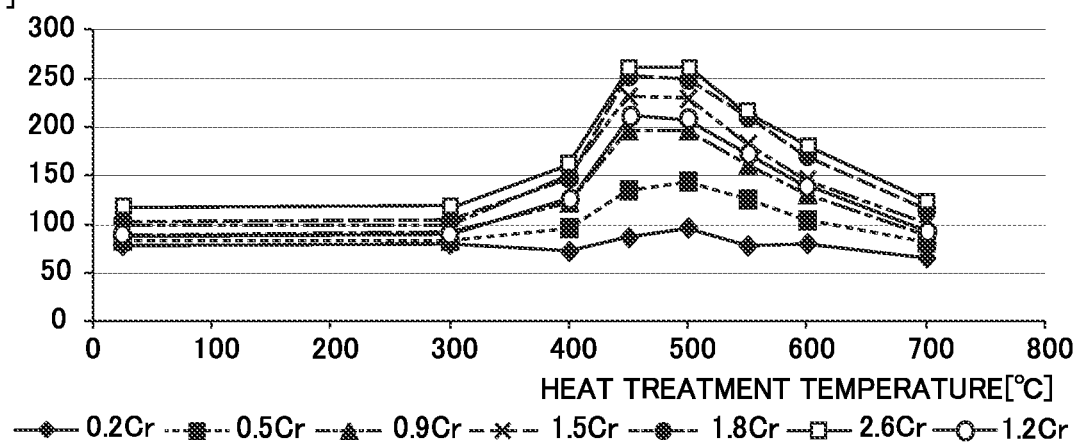

COPPER ALLOY POWDER, METHOD OF PRODUCING ADDITIVELY-MANUFACTURED ARTICLE, AND ADDITIVELY-MANUFACTURED ARTICLE

CROSS-REFERENCE TO RELATED APPLICATION

This application is a Divisional Application of application Ser. No. 15/791,675 filed on Oct. 24, 2017, claiming priority based on Japanese Patent Application No. 2016-208895 filed Oct. 25, 2016, Japanese Patent Application No. 2017-111709 filed Jun. 6, 2017, and Japanese Patent Application No. 2017-193374 filed Oct. 3, 2017 the entire contents of which are hereby incorporated by reference.

BACKGROUND OF THE INVENTION

Field of the Invention

The present disclosure relates to a copper alloy powder, a method of producing an additively-manufactured article, and an additively-manufactured article.

Description of the Background Art

Japanese Patent Laying-Open No. 2011-21218 discloses a laser additive-manufacturing apparatus (also referred to as a "3D printer") for metal powder.

SUMMARY OF INVENTION

An additive manufacturing method for metal powder is of interest as a processing technology for metal products. The additive manufacturing method allows creation of a complicated shape which has been impossible by cutting. Examples of production of additively-manufactured articles produced from iron alloy powder, aluminum alloy powder, titanium alloy powder, and the like have heretofore been reported. In other words, additively-manufactured articles composed of iron alloy, aluminum alloy or titanium alloy powder, or the like have heretofore been reported. However, there is no report of an additively-manufactured article composed of copper alloy.

An object of the present disclosure is to provide an additively-manufactured article composed of copper alloy.

[1] A copper alloy powder is a copper alloy powder for additive manufacturing. The copper alloy powder contains more than 1.00 mass % and not more than 2.80 mass % of chromium, and a balance of copper.

[2] The copper alloy powder may contain more than 1.05 mass % and not more than 2.80 mass % of chromium.

[3] The copper alloy powder may contain more than 1.00 mass % and not more than 2.00 mass % of chromium.

[4] The copper alloy powder may contain more than 1.05 mass % and not more than 2.00 mass % of chromium.

[5] A method of producing an additively-manufactured article includes the following first and second steps.

First step: prepare the copper alloy powder of any of items [1] to [4] above.

Second step: produce an additively-manufactured article using the copper alloy powder.

The additively-manufactured article is produced such that (i) forming a powder layer including a copper alloy powder and (ii) solidifying the copper alloy powder at a predetermined position in the powder layer to form a shaped layer are sequentially repeated to stack such shaped layers to thus produce the additively-manufactured article.

[6] The method of producing an additively-manufactured article may further comprise a third step of heat-treating the additively-manufactured article.

[7] In the third step, the additively-manufactured article may be heat-treated at a temperature of not lower than 300° C.

[8] In the third step, the additively-manufactured article may be heat-treated at a temperature of not lower than 400° C.

[9] In the third step, the additively-manufactured article may be heat-treated at a temperature of not higher than 700° C.

[10] In the third step, the additively-manufactured article may be heat-treated at a temperature of not higher than 600° C.

[11] An additively-manufactured article is an additively-manufactured article composed of a copper alloy. The additively-manufactured article contains more than 1.00 mass % and not more than 2.80 mass % of chromium, and a balance of copper. The additively-manufactured article has a relative density of not less than 96% and not more than 100% with respect to a theoretical density of the copper alloy, and has an electrical conductivity of not less than 10% IACS.

[12] The additively-manufactured article may contain more than 1.05 mass % and not more than 2.80 mass % of chromium.

[13] The additively-manufactured article may contain more than 1.00 mass % and not more than 2.00 mass % of chromium.

[14] The additively-manufactured article may contain more than 1.05 mass % and not more than 2.00 mass % of chromium.

[15] The additively-manufactured article may have an electrical conductivity of not less than 30% IACS.

[16] The additively-manufactured article may have an electrical conductivity of not less than 50% IACS.

[17] The additively-manufactured article may have an electrical conductivity of not less than 70% IACS.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a first schematic diagram illustrating a process of producing an additively-manufactured article.

FIG. 11 is a graph representing a relationship between the heat treatment temperature of the third step and Vickers hardness.

DESCRIPTION OF THE PREFERRED EMBODIMENTS

Figure 1:
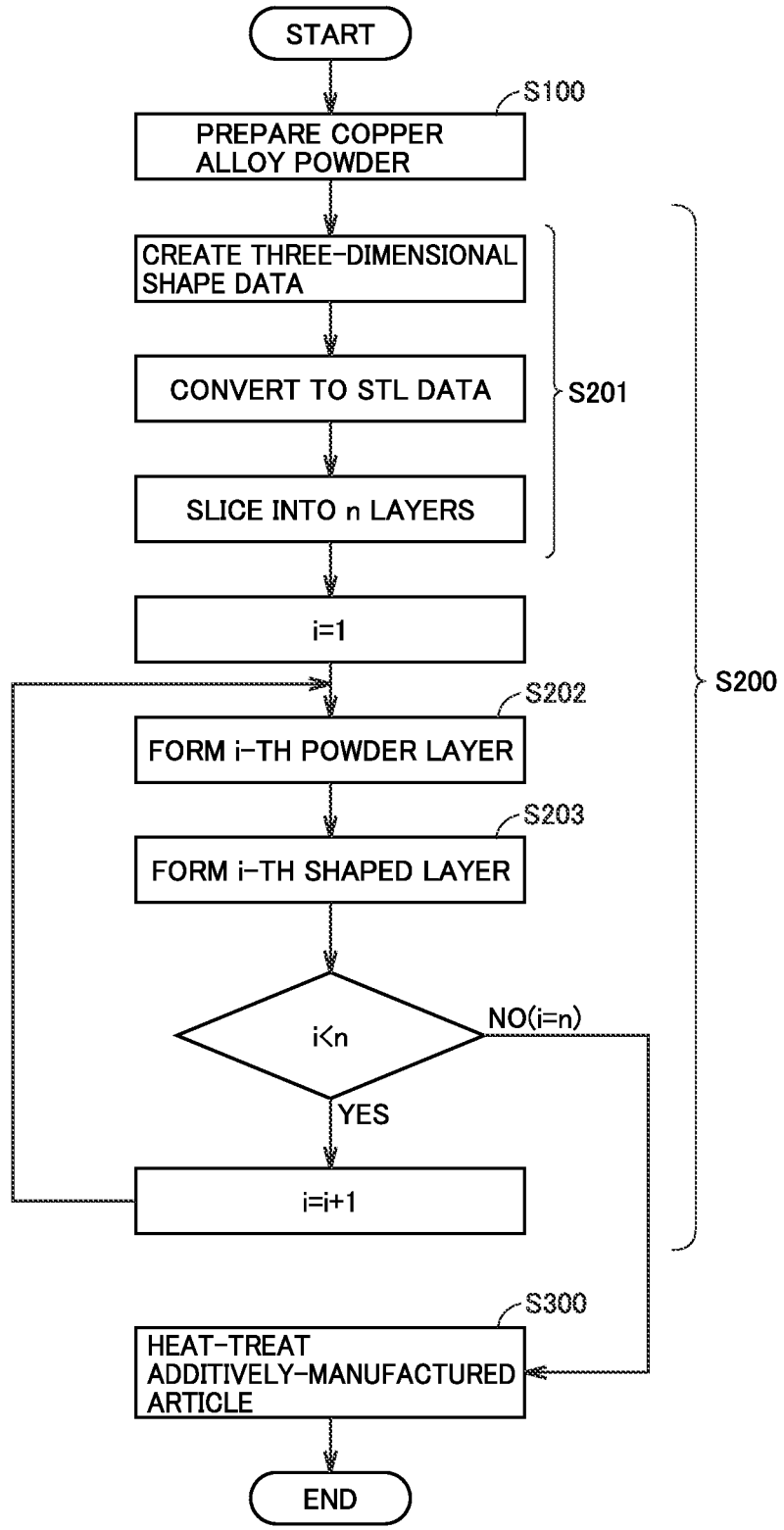
FIG. 1 is a flowchart generally showing a method of producing an additively-manufactured article according to an embodiment of the present disclosure.

In the following, an embodiment of the present disclosure (hereinafter referred to as "the present embodiment") will be described. Note, however, that the following description does not limit the scope of the invention of the present disclosure.

Initially, how the present embodiment has been found will be described.

For mechanical parts required to have mechanical strength and high electrical conductivity, copper is often used. Examples of mechanical parts composed of copper may for example be parts of welding torch, electric power distribution facility, and the like.

Initially, producing an additively-manufactured article using pure copper powder has been considered. However, depending on the pure copper powder, a desired additively-manufactured article could not be obtained. Specifically, the additively-manufactured article produced using pure copper powder had many voids and had a density significantly decreased relative to that of a dense cast material. Reduction in density means reduction in mechanical strength (for example, tensile strength or the like). Further, the article also had an electrical conductivity significantly decreased relative to that of the dense cast material. In order to improve the density and the electrical conductivity, a variety of production conditions have been considered. None of the production conditions allowed the article to have a stable final physical property, and it was thus difficult to improve the density and the electrical conductivity.

Accordingly, copper alloy powder was considered. As a result, it has been found that by using a copper alloy powder having a specific composition, an additively-manufactured article having a practical density and a practical electrical conductivity can be produced, and that by heat-treating the additively-manufactured article at a particular temperature of higher, the additively-manufactured article can be significantly improved in mechanical strength and electrical conductivity. Hereafter, the present embodiment will more specifically be described.

<Copper Alloy Powder>

The copper alloy powder of the present embodiment corresponds to toner or ink of a two-dimensional printer. In the present embodiment, as long as a copper alloy powder having a specific composition described below is prepared, its production method should not be particularly limited.

The copper alloy powder can be produced for example by a gas atomization method or a water atomization method. For example, a molten copper alloy is first prepared. The molten metal is introduced into a tundish. The molten metal is dripped from the tundish. The molten metal being dropped is brought into contact with high pressure gas or high pressure water. As a result, the molten metal is rapidly cooled to be solidified, and a copper alloy powder is thus produced. Alternatively, a plasma atomization method, a centrifugal atomization method, or the like may for example be used to produce the copper alloy powder.

A copper alloy powder of a specific composition is used in the present embodiment. More specifically, the copper alloy powder is a powder of a copper alloy which contains more than 1.00 mass % and not more than 2.80 mass % of chromium (Cr), and a balance of copper (Cu). The balance may contain an impurity element besides Cu. The impurity element may be an element (hereinafter an "additive element") intentionally added during the production of the copper alloy powder. In other words, the balance may contain Cu and the additive element. The additive element includes nickel (Ni), zinc (Zn), tin (Sn), silver (Ag), beryllium (Be), zirconium (Zr), aluminum (Al), silicon (Si), cobalt (Co), titanium (Ti), magnesium (Mg), tellurium (Te), and the like, for example. The impurity element may for example be an element (hereinafter an "incidental impurity element") incidentally introduced during the production of the copper alloy powder. In other words, the balance may contain Cu and the incidental impurity element. Examples of the incidental impurity element may be oxygen (O), phosphorus (P), iron (Fe) and the like. The balance may contain Cu, the additive element, and the incidental impurity element. The copper alloy powder may contain a total of less than 0.30 mass % of the additive element and incidental impurity element, for example. For example, the oxygen content in the copper alloy powder can be measured by a method complying with "JIS H 1067: Methods for determination of oxygen in copper."

The Cr content in the copper alloy powder is measured by an ICP emission spectrometry complying with "JIS H 1071: Methods for determination of chromium in copper and copper alloys." The Cr content is measured at least 3 times. An average value of the at least 3 measurements is adopted as the Cr content. The Cr content may be not less than 1.01 mass %, more than 1.05 mass %, not less than 1.10 mass %, not less than 1.20 mass %, not less than 1.22 mass % or not less than 1.78 mass %. The Cr content may be not more than 2.70 mass %, not more than 2.60 mass %, not more than 2.30 mass %, not more than 2.00 mass %, not more than 1.90 mass %, not more than 1.80 mass %, not more than 1.78 mass %, or not more than 1.46 mass %.

The Cu content in the copper alloy powder can be measured by a method complying with "JIS H 1051: Copper and copper alloys—Determination of copper content." The Cu content is measured at least 3 times. An average value of the at least 3 measurements is adopted as the Cu content. The Cu content may for example be higher than 97.9 mass % and less than 99.0 mass %.

The copper alloy powder may have an average particle size of 1 to 200 μm, for example. The average particle size herein refers to a particle size at a cumulative value of 50% from the side of finer particles in a volume-based particle size distribution measured by a laser diffraction/scattering method. Hereinafter, the average particle size is also indicated as "d50". d50 can be adjusted for example by gas pressure in gas atomization, sizing, and the like. d50 may be adjusted in accordance with a pitch at which layers are stacked to produce an additively-manufactured article. d50 may for example be 5 to 50 μm, 50 to 100 μm, or 100 to 200 μm. The particle shape should not be particularly limited. The particle shape may be a substantially spherical shape or an irregular shape.

[Method of Producing Additively-Manufactured Article]

FIG. 1 is a flowchart generally showing a method of producing an additively-manufactured article of the present embodiment. The production method in the present embodiment includes a first step (S100) and a second step (S200). The production method in the present embodiment may further include a third step (S300) after the second step (S200). Hereinafter, each step will be described in order.

<<First Step (S100)>>

In the first step (S100), the aforementioned copper alloy powder is prepared.

<<Second step (S200)>>

In the second step (S200), an additively-manufactured article is produced using the copper alloy powder.

Herein, powder bed fusion will be described. However, an additive manufacturing method other than powder bed fusion may be used. For example, directed energy deposition may also be used. Cutting may be performed during additive manufacturing.

Here, a description will be given of a manner of solidifying the copper alloy powder by a laser. Note, however, that the laser is only one example and as long as the copper alloy powder is solidified, the means for solidification should not be limited to the laser. For example, electron beam, plasma, or the like may be used.

(Data Processing (S201))

First, three-dimensional shape data is created by 3D-CAD or the like.

Figure 2:
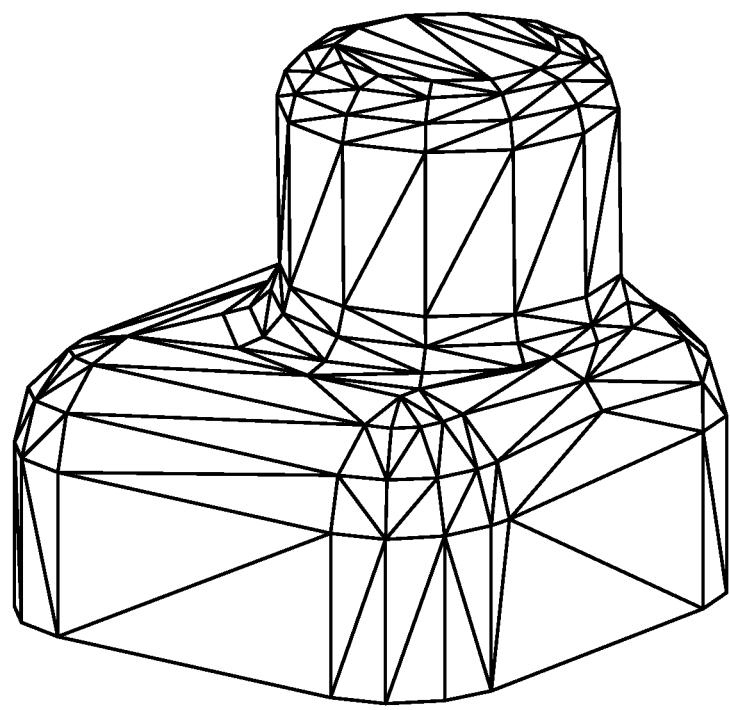
FIG. 2 shows an example of STL data.

The three-dimensional shape data is converted to STL data for example. FIG. 2 shows an example of STL data. In STL data, division into elements (so-called "meshing") is done by the finite-element method, for example.

Figure 3:
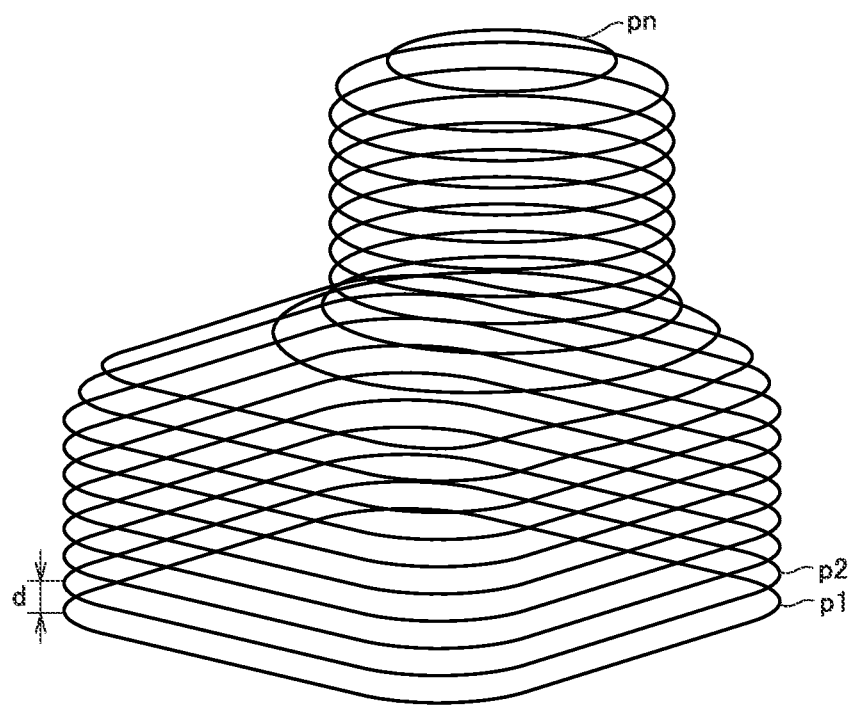
FIG. 3 shows an example of slice data.

From the STL data, slice data is produced. FIG. 3 shows an example of the slice data. The STL data is divided into n layers. More specifically, the STL data is divided into a first shaped layer p1, a second shaped layer p2, . . . , and an nth shaped layer pn. Each layer's thickness (a slice thickness d) may be 10 to 150 μm for example.

(Forming a Powder Layer (S202))

A powder layer including the copper alloy powder is formed.

FIG. 4 is a first schematic diagram illustrating a process of producing an additively-manufactured article. A laser additive-manufacturing apparatus 100 includes a piston 101, a table 102, and a laser emission unit 103. Table 102 is supported by piston 101. Piston 101 is configured to be capable of lifting and lowering table 102. On table 102, an additively-manufactured article is produced.

Forming the powder layer (S202), and forming a shaped layer (S203), as will be described hereinafter, may be done in an inert gas atmosphere for example. This is done to suppress oxidation of the additively-manufactured article. The inert gas may for example be argon (Ar), nitrogen ($N_2$), helium (He), or the like. Instead of the inert gas atmosphere, a reducing gas atmosphere may be used. The reducing gas is hydrogen ($H_2$) or the like for example. Moreover, the inert gas atmosphere may be replaced with a vacuumed atmosphere.

Based on the slice data, piston 101 lowers table 102 by a distance corresponding to one layer. On table 102, the copper alloy powder corresponding to one layer is spread. In this way, a first powder layer 1 including the copper alloy powder is formed. First powder layer 1 may have a surface smoothed by means of a squeezing blade or the like (not shown). First powder layer 1 may be formed substantially only of the copper alloy powder. First powder layer 1 may also include a laser absorber (e.g., resin powder) or the like, in addition to the copper alloy powder.

(Forming a shaped layer (S203))

Subsequently, a shaped layer is formed.

Figure 5:
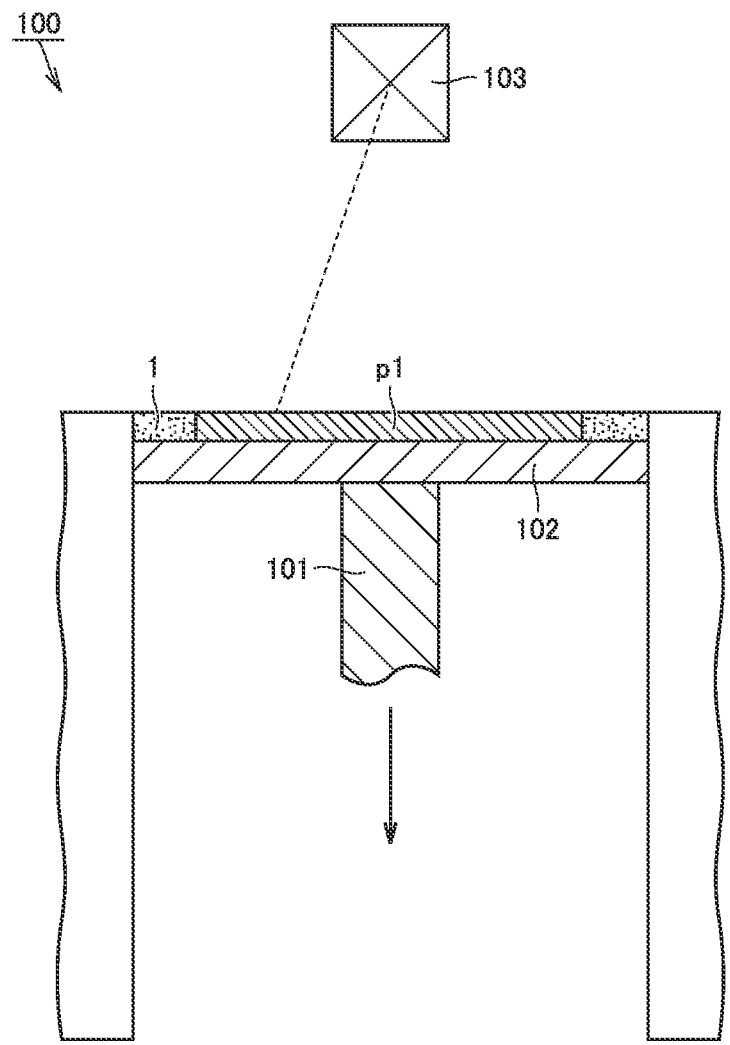
FIG. 5 is a second schematic diagram illustrating the process of producing the additively-manufactured article.

The shaped layer will configure a portion of the additively-manufactured article. FIG. 5 is a second schematic diagram illustrating the process of producing the additively-manufactured article. Laser emission unit 103 applies a laser beam to a predetermined position in first powder layer 1, based on the slice data. Before the laser beam is applied, first powder layer 1 may be heated in advance. The copper alloy powder irradiated with the laser beam is melted and sintered and accordingly solidified. In this way, a first shaped layer p1 is formed. Thus, the copper alloy powder at a predetermined position in the powder layer is solidified to thereby form a shaped layer.

Laser emission unit 103 can be a general-purpose laser device. The laser beam source can for example be a fiber laser, a YAG laser, a $CO_2$ laser, a semiconductor laser, a green laser or the like. The laser beam output power may for example be 20 to 1000 W or may be 200 to 500 W. The laser beam scanning velocity can be adjusted within a range for example of 50 to 2000 mm/s.

The laser beam energy density can be adjusted within a range of 10 to 2000 J/mm³. The energy density is calculated by the following expression (I):

$$E=P/(v \times s \times d) \quad (I),$$

where E represents laser beam energy density [unit: J/mm³], P represents laser output power [unit: W], v represents scanning velocity [unit: mm/s], s represents scanning width [unit: mm], and d represents slice thickness [unit: mm].

Figure 6:
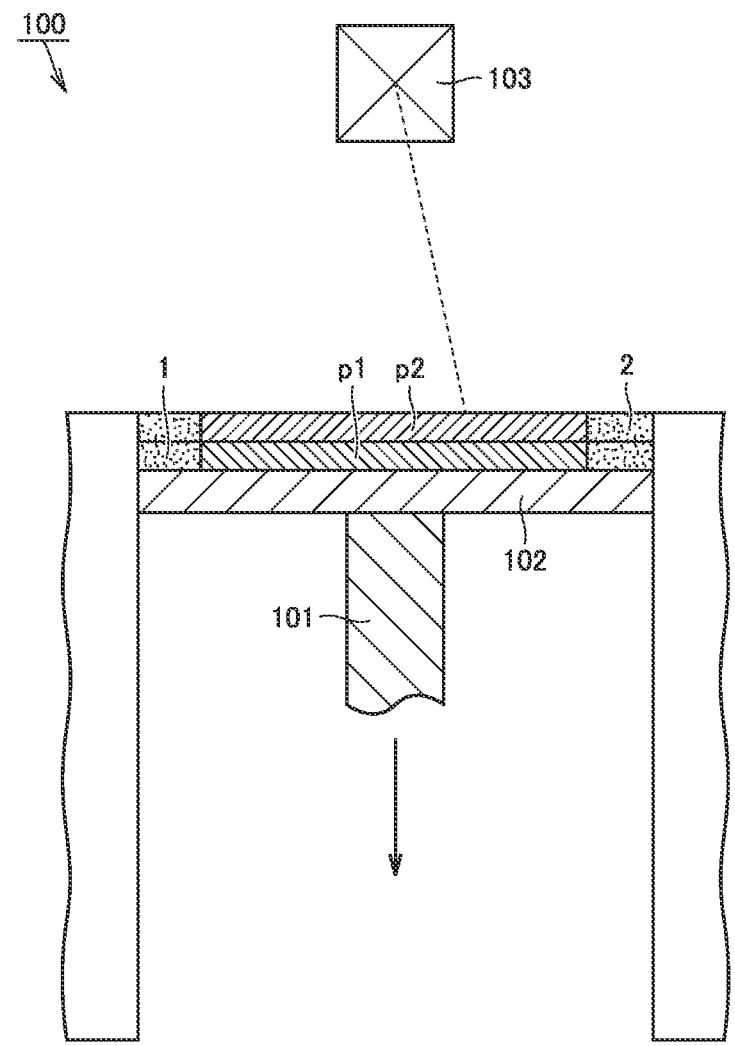
FIG. 6 is a third schematic diagram illustrating the process of producing the additively-manufactured article.

FIG. 6 is a third schematic diagram illustrating the process of producing the additively-manufactured article. After first shaped layer p1 is formed, piston 101 further lowers table 102 by a distance corresponding to one layer. By the same procedure as above, a second powder layer 2 is formed, and a second shaped layer p2 is subsequently formed. Subsequently, forming the powder layer (202) and forming the shaped layer (203) are sequentially repeated to stack such shaped layers to produce the additively-manufactured article.

Figure 7:
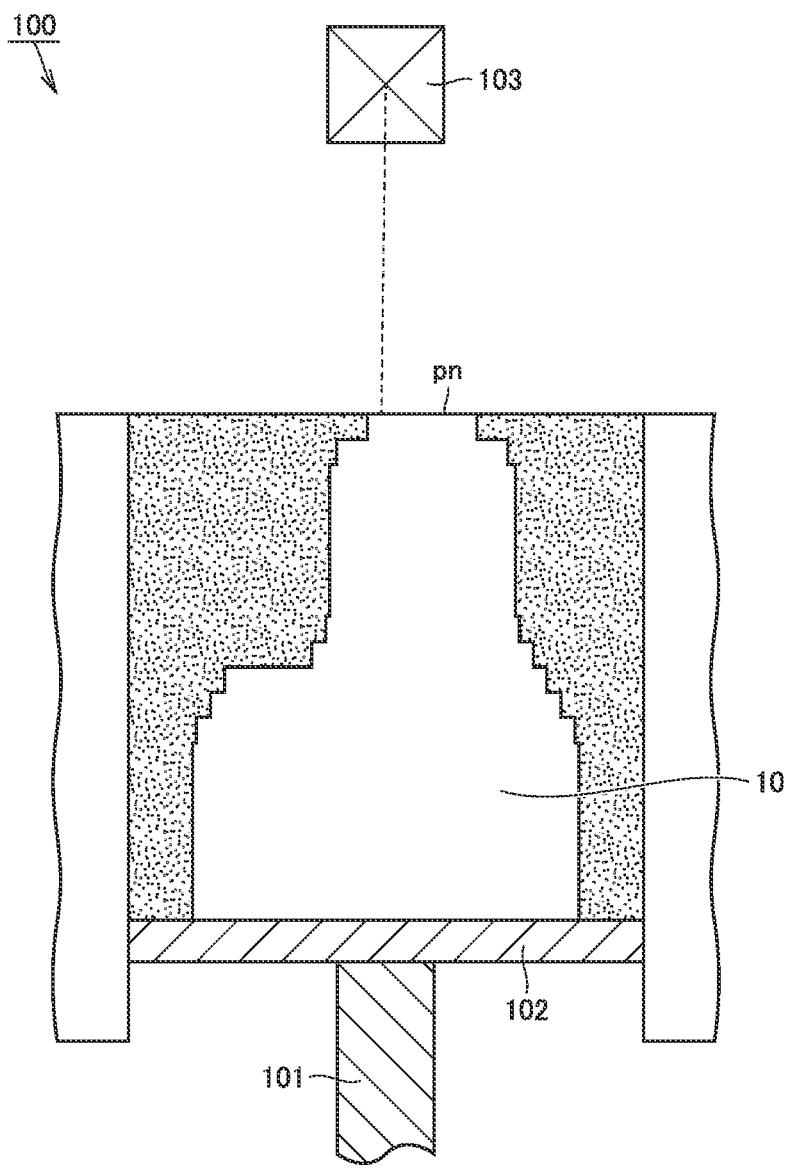
FIG. 7 is a fourth schematic diagram illustrating the process of producing the additively-manufactured article.

FIG. 7 is a fourth schematic diagram illustrating the process of producing the additively-manufactured article. Finally, an n-th shaped layer pn is stacked and an additively-manufactured article 10 is thus completed. In the present embodiment, a copper alloy powder having a specific composition is used, and additively-manufactured article 10 can have a high relative density.

<<Third Step (S300)>>

The production method in the present embodiment may further include a third step (S300) of heat-treating the additively-manufactured article. As a result, it is expected that the additively-manufactured article is drastically improved in mechanical strength (for example, tensile strength, Vickers hardness and so forth) and electrical conductivity.

In the present embodiment, a general heat treatment furnace can be used. The heat treatment's temperature is measured with a temperature sensor accompanying the heat treatment furnace. For example, if the heat treatment furnace has a set temperature of 300° C., it is assumed that the additively-manufactured article is heat-treated at 300° C.

The additively-manufactured article may for example be heat-treated for not less than 1 minute and not more than 10 hours, not less than 10 minutes and not more than 5 hours, not less than 30 minutes and not more than 3 hours, or not less than 1 hour and not more than 2 hours. The heat treatment can be performed in an atmosphere for example of atmospheric air, nitrogen, argon, hydrogen, vacuum, or the like.

In the third step, the additively-manufactured article may be heat-treated at a temperature of not lower than 300° C., not lower than 400° C., or not lower than 450° C. Further improved mechanical strength and electrical conductivity are thus expected.

In the third step, the additively-manufactured article may be heat-treated at a temperature of not higher than 700° C., not higher than 600° C., or not higher than 550° C. Well-balanced mechanical strength and electrical conductivity are thus expected. The additively-manufactured article may be heat-treated at a temperature exceeding 700° C. However, a temperature exceeding 700° C. has a possibility of a reduced mechanical strength and electrical conductivity enhancement effect.

<Additively-Manufactured Article>

The additively-manufactured article of the present embodiment is typically produced by the above production method.

The additively-manufactured article of the present embodiment can have a complicated shape which cannot be obtained by cutting. Moreover, the additively-manufactured article of the present embodiment can be excellent in both mechanical strength and electrical conductivity. The additively-manufactured article of the present embodiment is applicable to a plasma torch by way of example.

(Composition)

The additively-manufactured article is composed of copper alloy. The additively-manufactured article contains more than 1.00 mass % and not more than 2.80 mass % of Cr, and a balance of Cu. Like the aforementioned copper alloy powder, the balance may include at least one of an additive element and an incidental impurity element. The Cr content of the additively-manufactured article is measured by a measurement method similar to the method of measuring the Cr content of the copper alloy powder. The Cr content may be not less than 1.01 mass %, more than 1.05 mass %, not less than 1.10 mass %, not less than 1.20 mass %, not less than 1.22 mass % or not less than 1.78 mass %. The Cr content may be not more than 2.70 mass %, not more than 2.60 mass %, not more than 2.30 mass %, not more than 2.00 mass %, not more than 1.90 mass %, not more than 1.80 mass %, not more than 1.78 mass %, or not more than 1.46 mass %.

The Cu content of the additively-manufactured article is measured by a measurement method similar to the method of measuring the Cu content of the copper alloy powder. The Cu content may for example be higher than 97.9 mass % and less than 99.0 mass %.

(Relative Density)

The additively-manufactured article has a relative density of not less than 96% and not more than 100% with respect to a theoretical density of the copper alloy. The "relative density" is calculated by dividing the actually measured density of the additively-manufactured article by the theoretical density. The theoretical density indicates the density of a cast material having the same composition as the additively-manufactured article. The actual density is measured in a method complying with "JIS Z 2501: Sintered metal materials—Determination of density, oil content and open porosity." Water is used as the liquid. The relative density is measured at least 3 times. An average value of the at least 3 measurements is adopted as the relative density.

An additively-manufactured article with high relative density is suitable for a component which requires high hermeticity. The higher the relative density is, higher mechanical strength can also be expected. The relative density may be not less than 97%, not less than 98%, not less than 99%, not less than 99.2%, not less than 99.4%, or not less than 99.8%.

(Mechanical Strength)

The additively-manufactured article can have excellent mechanical strength. For example, the additively-manufactured article can have a tensile strength of not less than 250 MPa. That is, the additively-manufactured article of the present embodiment can have a tensile strength equivalent to or more than that of oxygen-free copper (UNS No.: C10200).

The "tensile strength" is measured through the following procedure.

Figure 8:
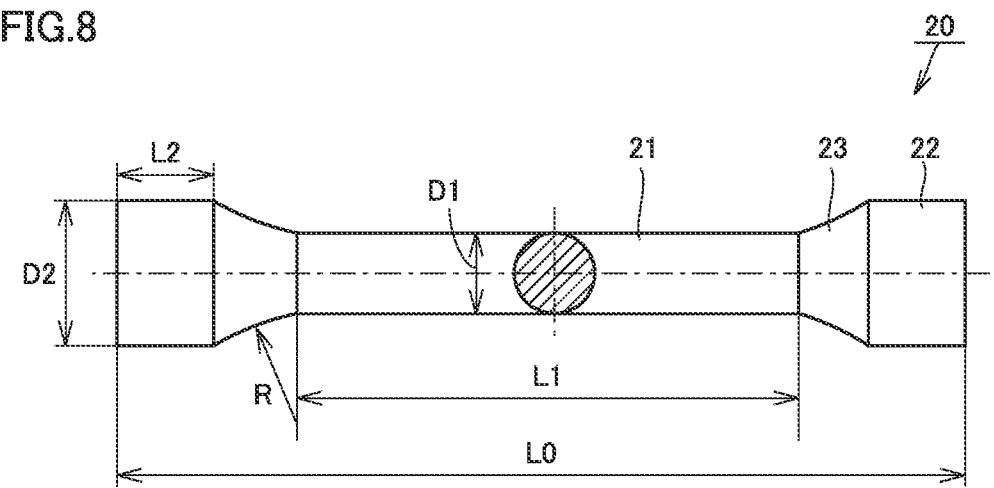
FIG. 8 is a plan view of a test specimen used for a tensile test.

For measurement of the tensile strength, a tension testing machine of Grade one or more defined in "JIS B 7721: Tension/compression testing machines—verification and calibration of the force-measuring system" is used. FIG. 8 is a plan view showing a test specimen used for a tensile test. A dumbbell-shaped test specimen 20 shown in FIG. 8 is prepared. Dumbbell-shaped test specimen 20 is attached to a gripper of the tensile testing machine. As the gripper, a gripper suitable for the shape of dumbbell-shaped test specimen 20 is used. Dumbbell-shaped test specimen 20 is attached such that it experiences tensile stress in its axial direction.

Dumbbell-shaped test specimen 20 is pulled at a rate of 2 mm/min. Dumbbell-shaped test specimen 20 is continuously pulled until it is broken. The maximum tensile stress detected before dumbbell-shaped test specimen 20 is broken is measured.

The maximum tensile stress is divided by the cross-sectional area of a parallel portion 21 to thereby calculate the tensile strength. The cross-sectional area of parallel portion 21 is 9.616 m$^2$ (=7c x 3.5 mm×3.5 mm/4). The tensile strength is measured at least 3 times. An average value of the at least 3 measurements is adopted as the tensile strength. Dumbbell-shaped test specimen 20 has portions with dimensions as follows:

total length (L0) of dumbbell-shaped test specimen 20: 36 mm length (L1) of parallel portion 21: 18±0.5 mm diameter (D1) of parallel portion 21: 3.5±0.05 mm radius (R) of shoulder portion 23: 10 mm length (L2) of grip portion 22: 4.0 mm diameter (D2) of grip portion 22: 6.0 mm The tensile strength can be adjusted by the heat treatment temperature of the third step. The tensile strength may for example be not less than 300 MPa, not less than 400 MPa, not less than 600 MPa, or not less than 700 MPa. The tensile strength may for example be not more than 800 MPa, or not more than 750 MPa.

The additively-manufactured article can have a Vickers hardness of not less than 90 HV. The "Vickers hardness" is measured by a method complying with "JIS Z 2244: Vickers hardness test—Test method." The Vickers hardness can also be adjusted by the heat treatment temperature of the third step. The Vickers hardness may for example be not less than 100 HV, not less than 150 HV, not less than 200 HV, or not less than 250 HV. The Vickers hardness may for example be not more than 300 HV.

(Electrical Conductivity)

The additively-manufactured article has an electrical conductivity of not less than 10% IACS. The "electrical conductivity" is measured with a commercially available eddy-current conductivity meter. The electrical conductivity is evaluated with reference to the electrical conductivity of the International Annealed Copper Standard (IACS). In other words, the electrical conductivity of the additively-manufactured article is represented as a percentage relative to the electrical conductivity of the IACS. For example, that an additively-manufactured article has an electrical conductivity of 50% IACS means that the additively-manufactured article has an electrical conductivity of half that of the IACS.

The electrical conductivity is measured at least 3 times. An average value of the at least 3 measurements is adopted as the electrical conductivity.

The electrical conductivity can be adjusted by the heat treatment temperature of the third step. The additively-manufactured article may have an electrical conductivity of not less than 20% IACS, not less than 30% IACS, not less than 50% IACS, not less than 70% IACS, not less than 80% IACS, or not less than 90% IACS. The additively-manufactured article may have an electrical conductivity for example of not more than 100% IACS.

Examples

Hereafter, examples will more specifically be described. Note, however, that the following examples do not limit the scope of the invention of the present disclosure.

An additively-manufactured article is produced along the flowchart indicated in FIG. 1.

Initially, copper alloy powders A1-A7 containing the chemical components indicated in the following table 1 were prepared (S100). These copper alloy powders were produced in accordance with a predetermined atomization method. Pure copper powder X and copper alloy powder Y were also prepared for comparison. Pure copper powder X is a powder with commercially available pure copper serving as a source material. Copper alloy powder Y is a powder with a commercially available copper alloy (product name "AMPCO940") serving as a source material. Hereinafter, these powders may be generally referred to as "metal powder."

TABLE 1

| list of powders | | |
|---|---|---|
| metal powders | chemical components | d50 (μm) |
| pure copper powder X | Cu (not less than 99.99 mass %) | 21.3 |
| copper alloy powder Y | Ni (2.52 mass %); Si (0.71 mass %); Cr (0.31 mass %); Cu (balance) | 20.0 |
| copper alloy powder A1 | Cr (0.22 mass %); O (0.09 mass %); Cu (balance) | 25.0 |

TABLE 1-continued

| list of powders | | |
|---|---|---|
| metal powders | chemical components | d50 (μm) |
| copper alloy powder A2 | Cr (0.51 mass %); O (0.04 mass %); Cu (balance) | 25.0 |
| copper alloy powder A3 | Cr (0.94 mass %); O (0.05 mass %); Cu (balance) | 20.7 |
| copper alloy powder A4 | Cr (1.46 mass %); O (0.04 mass %); Cu (balance) | 24.9 |
| copper alloy powder A5 | Cr (1.78 mass %); O (0.05 mass %); Cu (balance) | 22.8 |
| copper alloy powder A6 | Cr (2.60 mass %); O (0.05 mass %); Cu (balance) | 23.8 |
| copper alloy powder A7 | Cr (1.22 mass %); O (0.06 mass %); Cu (balance) | 24.7 |

A laser additive-manufacturing apparatus with the following specifications was prepared.

Laser: fiber laser, with a maximum output power of 400 W

Spot diameter: 0.05 to 0.20 mm

Scanning velocity: not more than 7000 mm/s

Layer stack pitch: 0.02 to 0.08 mm

Maximum build size: 250 mm×250 mm×280 mm

1. Pure Copper Powder X

Three-dimensional shape data was created (S201). (i) Forming a powder layer including a metal powder (S202) and (ii) solidifying the metal powder at a predetermined position in the powder layer to form a shaped layer (S203) are sequentially repeated to stack such shaped layers. Thus, using pure copper powder X, additively-manufactured articles according to Nos. X-1 to X-40 were produced (S200). The additively-manufactured article is a cylinder of 14 mm in diameter×15 mm in height (and the following additively-manufactured articles are also similar, unless otherwise specified). The additively-manufactured articles were produced under conditions indicated in Table 2 and Table 3. In accordance with the above-described methods, the relative density and electrical conductivity of each additively-manufactured article were measured. The results are shown in Table 2 and Table 3.

TABLE 2

| | pure copper powder X (part 1) | | | | | | |
|---|---|---|---|---|---|---|---|
| | production method | | | | additively-manufactured article | | |
| | 1st step | 2nd step conditions of laser irradiation | | 3rd step heat | | | |
| Nos. | metal powder | scanning velocity mm/s | energy density J/mm³ | treatment temperature ° C. | relative density % | tensile strength MPa | electrical conductivity % IACS |
| X-1 | pure copper powder X | 200 | 587.3 | none | unmeasurable | — | 49.58 |
| X-2 | | | | | unmeasurable | — | 64.72 |
| X-3 | | | | | unmeasurable | — | 50.44 |
| X-4 | | | | | unmeasurable | — | 65.85 |
| X-5 | | | | | 96.723 | — | 85.24 |
| X-6 | | | | | 92.260 | — | 67.21 |
| X-7 | | | | | unmeasurable | — | 48.89 |
| X-8 | | | | | unmeasurable | — | 64.95 |
| X-9 | pure copper powder X | 300 | 391.5 | none | unmeasurable | — | 63.13 |
| X-10 | | | | | unmeasurable | — | 63.59 |
| X-11 | | | | | unmeasurable | — | 67.89 |
| X-12 | | | | | unmeasurable | — | 65.63 |
| X-13 | | | | | unmeasurable | — | 58.15 |

TABLE 2-continued pure copper powder X (part 1)

| | production method | | | additively-manufactured article | | |
|---|---|---|---|---|---|---|
| | 1st step | 2nd step conditions of laser irradiation | | 3rd step heat | | | |
| Nos. | metal powder — | scanning velocity mm/s | energy density J/mm³ | treatment temperature °C. | relative density % | tensile strength MPa | electrical conductivity % IACS |
| X-14 | | | | | unmeasurable | — | 68.12 |
| X-15 | | | | | unmeasurable | — | 64.04 |
| X-16 | | | | | unmeasurable | — | 61.32 |
| X-17 | pure | 400 | 293.7 | none | unmeasurable | — | 70.51 |
| X-18 | copper | | | | unmeasurable | — | 63.13 |
| X-19 | powder X | | | | unmeasurable | — | 75.21 |
| X-20 | | | | | unmeasurable | — | 66.15 |
| X-21 | | | | | unmeasurable | — | 62.68 |
| X-22 | | | | | 92.215 | — | 67.67 |
| X-23 | | | | | unmeasurable | — | 71.14 |
| X-24 | | | | | unmeasurable | — | 63.13 |

TABLE 3 pure copper powder X (part 2)

| | production method | | | additively-manufactured article | | |
|---|---|---|---|---|---|---|
| | 1st step | 2nd step conditions of laser irradiation | | 3rd step heat | | | |
| Nos. | metal powder — | scanning velocity mm/s | energy density J/mm³ | treatment temperature °C. | relative density % | tensile strength MPa | electrical conductivity % IACS |
| X-25 | pure | 500 | 234.9 | none | unmeasurable | — | 73.64 |
| X-26 | copper | | | | unmeasurable | — | 62.00 |
| X-27 | powder X | | | | 93.054 | — | 82.10 |
| X-28 | | | | | unmeasurable | — | 64.27 |
| X-29 | | | | | unmeasurable | — | 64.04 |
| X-30 | | | | | unmeasurable | — | 65.40 |
| X-31 | | | | | unmeasurable | — | 75.21 |
| X-32 | | | | | unmeasurable | — | 62.23 |
| X-33 | pure | 600 | 195.8 | none | unmeasurable | — | 89.46 |
| X-34 | copper | | | | unmeasurable | — | 73.96 |
| X-35 | powder X | | | | 98.311 | — | 92.58 |
| X-36 | | | | | unmeasurable | — | 75.21 |
| X-37 | | | | | unmeasurable | — | 61.77 |
| X-38 | | | | | unmeasurable | — | 75.21 |
| X-39 | | | | | 98.311 | — | 90.24 |
| X-40 | | | | | unmeasurable | — | 73.33 |

As seen from Table 2 and Table 3, the additively-manufactured articles produced from pure-copper powder X significantly vary from one another in final physical properties even they are produced under a fixed condition. In tables 2 and 3 under a column titled "Relative density," "Unmeasurable" means that an additively-manufactured article has many voids and a highly reliable density could not be measured therefrom. Pure copper may be considered to have an electrical conductivity of 100% IACS. The additively-manufactured articles produced from pure-copper powder X are significantly lower in electrical conductivity than pure copper. It is considered difficult to produce a practically applicable mechanical part from pure-copper powder X.

2. Copper Alloy Powder Y (Powder of Commercially Available Copper Alloy)

Under the conditions shown in Table 4 indicated below, additively-manufactured articles of No. Y-1 to No. Y-7 were produced in a manner similar to the above-described manner. Some additively-manufactured articles were heat-treated in a nitrogen atmosphere for 3 hours at a temperature indicated in table 4 under a column titled "heat treatment temperature" (S300). The additively-manufactured articles marked "None" in the column of "heat treatment temperature" were not heat-treated. In accordance with the above-described methods, the relative density and electrical conductivity of each additively-manufactured article were measured. The results are indicated below in table 4.

TABLE 4 copper alloy powder Y (powder of commercially available copper alloy)

| | production method | | | additively-manufactured article | | |
|---|---|---|---|---|---|---|
| | 1st step | 2nd step conditions of laser irradiation | | 3rd step heat | | |
| Nos. | metal powder | scanning velocity mm/s | energy density J/mm³ | treatment temperature ° C. | relative density % | tensile strength MPa | electrical conductivity % IACS |

| Nos. | metal powder | scanning velocity mm/s | energy density J/mm³ | treatment temperature ° C. | relative density % | tensile strength MPa | electrical conductivity % IACS |
|---|---|---|---|---|---|---|---|
| Y-1 | copper | 400 | 156.3 | none | 99.03% | — | — |
| Y-2 | alloy | 400 | 156.3 | 300 | 98.98% | — | 18.23 |
| Y-3 | powder Y | 400 | 156.3 | 300 | 99.07% | — | 18.23 |
| Y-4 | | 400 | 156.3 | none | 99.30% | — | — |
| Y-5 | copper | 800 | 192.7 | 300 | 99.23% | — | 18.37 |
| Y-6 | alloy | 800 | 192.7 | 300 | 99.49% | — | 18.50 |
| Y-7 | powder Y | 800 | 192.7 | none | 99.33% | — | — |

As shown in Table 4, the additively-manufactured articles produced from copper alloy powder Y (a powder of a commercially available copper alloy) had an electrical conductivity significantly lower than the commercially available copper alloy's electrical conductivity (about 45.5% IACS).

3. Copper Alloy Powder A1 (Cr Content: 0.22 Mass %)

Under the conditions shown in Table 5 indicated below, additively-manufactured articles of No. A1-1 to No. A1-14 were produced in a manner similar to the above-described manner. Some additively-manufactured articles were heat-treated in a nitrogen atmosphere for 3 hours at a temperature indicated in table 5 under the column titled "heat treatment temperature." In accordance with the above-described methods, the relative density, electrical conductivity and tensile strength of each additively-manufactured article were measured. Tensile strength was measured in dumbbell-shaped test specimen 20 (see FIG. 8) produced separately (this also applies hereinafter). The results are indicated below in table 5.

As seen from Table 5, the additively-manufactured articles produced from copper alloy powder A1 had final physical properties with suppressed variation. It is believed that these additively-manufactured articles have a level in mechanical strength and electrical conductivity allowing the articles to be used as a machine part.

4. Copper Alloy Powder A2 (Cr Content: 0.51 Mass %)

Under the conditions shown in Table 6 indicated below, additively-manufactured articles of No. A2-1 to No. A2-12 were produced in a manner similar to the above-described manner. Some additively-manufactured articles were heat-treated in a nitrogen atmosphere for 3 hours at a temperature indicated in table 6 under the column titled "heat treatment temperature." In accordance with the above-described methods, the relative density, electrical conductivity and tensile strength of each additively-manufactured article were measured. The results are indicated below in table 6.

TABLE 5 copper alloy powder A1 (Cr content: 0.22 mass %)

| Nos. | metal powder | scanning velocity mm/s | energy density J/mm³ | treatment temperature ° C. | relative density % | tensile strength MPa | electrical conductivity % IACS |
|---|---|---|---|---|---|---|---|
| A1-1 | copper | 200 | 587.3 | 300 | 96.395 | — | 62.57 |
| A1-2 | alloy | 300 | 391.5 | | 97.167 | — | 63.93 |
| A1-3 | powder | 400 | 293.7 | | 97.173 | — | 62.68 |
| A1-4 | A1 | 500 | 234.9 | | 97.352 | — | 62.00 |
| A1-5 | | 600 | 195.8 | | 97.967 | — | 62.00 |
| A1-6 | | 700 | 167.8 | | 97.027 | — | 61.78 |
| A1-7 | copper | 600 | 274.1 | 300 | 98.241 | — | 63.47 |
| A1-8 | alloy | 600 | 228.4 | | 98.353 | 215.02 | 64.27 |
| A1-9 | powder | 600 | 195.8 | | 97.967 | — | 62.00 |
| A1-10 | A1 | 600 | 171.3 | | 96.457 | — | 59.34 |
| A1-11 | | 600 | 152.3 | | 96.708 | — | 61.09 |
| A1-12 | copper | 500 | 234.9 | none | — | 198.56 | — |
| A1-13 | alloy | 600 | 195.8 | | — | 219.78 | — |
| A1-14 | powder A1 | 700 | 167.8 | | — | 186.74 | — |

TABLE 6

| | | production method | | | additively-manufactured article | | |
|---|---|---|---|---|---|---|---|
| | 1st step | 2nd step conditions of laser irradiation | | 3rd step heat | | | |
| Nos. | metal powder — | scanning velocity mm/s | energy density J/mm³ | treatment temperature ° C. | relative density % | tensile strength MPa | electrical conductivity % IACS |
| A2-1 | copper | 200 | 587.3 | 300 | 98.952 | — | 36.86 |
| A2-2 | alloy | 300 | 391.5 | | 99.243 | — | 36.99 |
| A2-3 | powder | 400 | 293.7 | | 99.199 | — | 37.17 |
| A2-4 | A2 | 500 | 234.9 | | 99.484 | — | 37.41 |
| A2-5 | | 600 | 195.8 | | 99.484 | — | 37.66 |
| A2-6 | copper | 500 | 274.1 | 300 | 99.361 | — | 37.50 |
| A2-7 | alloy | 600 | 228.4 | | 99.596 | — | 37.56 |
| A2-8 | powder | 500 | 234.9 | | 99.277 | — | 37.99 |
| A2-9 | A2 | 600 | 195.8 | | 99.255 | — | 38.12 |
| A2-10 | copper | 500 | 234.9 | none | — | 250.7 | — |
| A2-11 | alloy | 600 | 195.8 | | — | 250.2 | — |
| A2-12 | powder A2 | 600 | 195.8 | | — | 243.8 | — |

As seen from Table 6, the additively-manufactured articles produced from copper alloy powder A2 had final physical properties with suppressed variation. It is believed that these additively-manufactured articles have a level in mechanical strength and electrical conductivity allowing the articles to be used as a machine part.

5. Copper Alloy Powder A3 (Cr Content: 0.94 Mass %)

Under the conditions shown in Table 7 indicated below, additively-manufactured articles of No. A3-1 to No. A3-7 were produced in a manner similar to the above-described manner. Some additively-manufactured articles were heat-treated in a nitrogen atmosphere for 3 hours at a temperature indicated in table 7 under the column titled "heat treatment temperature." In accordance with the above-described methods, the relative density, electrical conductivity and tensile strength of each additively-manufactured article were measured. The results are indicated below in table 7.

As seen from Table 7, the additively-manufactured articles produced from copper alloy powder A3 had final physical properties with suppressed variation. It is believed that these additively-manufactured articles have a level in mechanical strength and electrical conductivity allowing the articles to be used as a machine part.

6. Considering Heat Treatment Temperature

Additively-manufactured articles were produced under the conditions indicated in tables 8, 9, and 10 indicated below. In accordance with the above-described methods, the relative density of each additively-manufactured article was measured. Furthermore, the additively-manufactured articles were heat-treated in a nitrogen atmosphere for 1 hours at temperatures indicated in tables 8, 9, and 10 under the column titled "heat treatment temperature." After the heat treatment, the tensile strength, electrical conductivity and Vickers hardness of each additively-manufactured article were measured. Note that the Vickers hardness was measured in the method as has been described above. The results are shown in tables 8, 9, and 10.

TABLE 7

| | | production method | | | additively-manufactured article | | |
|---|---|---|---|---|---|---|---|
| | 1st step | 2nd step conditions of laser irradiation | | 3rd step heat treatment | | | |
| Nos. | metal powder — | scanning velocity mm/s | energy density J/mm³ | temperature ° C. | relative density % | tensile strength MPa | electrical conductivity % IACS |
| A3-1 | copper | 200 | 587.3 | 300 | 99.250 | — | 26.35 |
| A3-2 | alloy | 300 | 391.5 | | 99.064 | — | 26.25 |
| A3-3 | powder | 400 | 293.7 | | 99.176 | — | 26.41 |
| A3-4 | A3 | 500 | 234.9 | | 99.101 | — | 26.44 |
| A3-5 | | 600 | 195.8 | | 99.228 | — | 26.63 |
| A3-6 | copper | 200 | 587.3 | none | — | 281.41 | — |
| A3-7 | alloy powder A3 | 600 | 195.8 | | — | 266.60 | — |

TABLE 8 consideration of heat treatment temperature (part 1)

| | production method | | | | additively-manufactured article | | | |
|---|---|---|---|---|---|---|---|---|
| | 1st step | | 2nd step conditions of laser irradiation | | 3rd step heat | | | |
| metal powders — | Cr content mass % | scanning velocity mm/s | energy density J/mm³ | treatment temperature ° C. | relative density % | Vickers hardness HV | tensile strength MPa | electrical conductivity % IACS |
| copper alloy powder A1 | 0.22 | 600 | 195.8 | none | 97.6 | 78.4 | 219.8 | 52.36 |
| | | | | 300 | | 79.4 | 253.2 | 62.23 |
| | | | | 400 | | 72.2 | 257.5 | 61.70 |
| | | | | 450 | | 86.4 | 298.8 | 76.70 |
| | | | | 500 | | 96.4 | 272.2 | 78.34 |
| | | | | 550 | | 77.9 | 286.7 | 76.70 |
| | | | | 600 | | 80.2 | 268.9 | 75.80 |
| | | | | 700 | | 66.2 | 242.6 | 71.70 |
| copper alloy powder A2 | 0.51 | 600 | 195.8 | none | 99.2 | 82.7 | 254.0 | 32.33 |
| | | | | 300 | | 82.9 | 256.6 | 38.23 |
| | | | | 400 | | 96.0 | 318.4 | 59.28 |
| | | | | 450 | | 134.9 | 436.5 | 73.64 |
| | | | | 500 | | 144.4 | 455.2 | 79.28 |
| | | | | 550 | | 125.6 | 387.4 | 79.60 |
| | | | | 600 | | 104.1 | 323.1 | 78.03 |
| | | | | 700 | | 81.0 | 263.9 | 76.56 |
| copper alloy powder A3 | 0.94 | 600 | 195.8 | none | 99.4 | 89.4 | 266.6 | 24.03 |
| | | | | 300 | | 92.3 | 275.2 | 26.63 |
| | | | | 400 | | 122.8 | 415.1 | 50.61 |
| | | | | 450 | | 196.6 | 601.8 | 68.80 |
| | | | | 500 | | 197.0 | 586.4 | 76.15 |
| | | | | 550 | | 160.5 | 486.0 | 83.04 |
| | | | | 600 | | 131.3 | 406.1 | 88.37 |
| | | | | 700 | | 88.1 | 294.7 | 91.80 |

TABLE 9 consideration of heat treatment temperature (part 2)

| | production method | | | | additively-manufactured article | | | |
|---|---|---|---|---|---|---|---|---|
| | 1st step | | 2nd step conditions of laser irradiation | | 3rd step heat | | | |
| metal powders — | Cr content mass % | scanning velocity mm/s | energy density J/mm³ | treatment temperature ° C. | relative density % | Vickers hardness HV | tensile strength MPa | electrical conductivity % IACS |
| copper alloy powder A4 | 1.46 | 300 | 391.5 | none | 99.8 | 98.8 | 324.0 | 19.14 |
| | | | | 300 | | 99.1 | 281.8 | 21.22 |
| | | | | 400 | | 149.9 | 477.5 | 42.38 |
| | | | | 450 | | 231.1 | 683.5 | 57.50 |
| | | | | 500 | | 229.5 | 656.0 | 72.64 |
| | | | | 550 | | 182.6 | 542.4 | 82.58 |
| | | | | 600 | | 146.1 | 447.1 | 88.22 |
| | | | | 700 | | 101.2 | 316.5 | 92.58 |
| copper alloy powder A5 | 1.78 | 800 | 146.8 | none | 99.2 | 103.2 | 290.6 | 14.37 |
| | | | | 300 | | 104.1 | 312.3 | 15.82 |
| | | | | 400 | | 147.7 | 462.5 | 31.13 |
| | | | | 450 | | 252.6 | 726.3 | 47.97 |
| | | | | 500 | | 248.9 | 735.7 | 61.77 |
| | | | | 550 | | 210.3 | 618.0 | 69.88 |
| | | | | 600 | | 170.6 | 510.3 | 73.96 |
| | | | | 700 | | 115.0 | 351.4 | 66.31 |
| copper alloy powder A6 | 2.60 | 800 | 146.8 | none | 99.3 | 117.8 | 370.8 | 14.04 |
| | | | | 300 | | 123.6 | 360.5 | 15.59 |
| | | | | 400 | | 159.6 | 545.3 | 31.04 |
| | | | | 450 | | 257.3 | 775.2 | 47.64 |
| | | | | 500 | | 259.8 | 757.7 | 61.10 |
| | | | | 550 | | 214.6 | 619.4 | 70.20 |
| | | | | 600 | | 176.6 | 528.9 | 75.68 |
| | | | | 700 | | 117.7 | 370.3 | 68.91 |

TABLE 10 consideration of heat treatment temperature (part 3)

| production method | | | | additively-manufactured article | | | |
|---|---|---|---|---|---|---|---|
| 1st step | 2nd step conditions of laser irradiation | | 3rd step heat | | | | |
| metal powders | Cr content mass % | scanning velocity mm/s | energy density J/mm³ | treatment temperature ° C. | relative density % | Vickers hardness HV | tensile strength MPa | electrical conductivity % IACS |

| metal powders | Cr content mass % | scanning velocity mm/s | energy density J/mm³ | treatment temperature ° C. | relative density % | Vickers hardness HV | tensile strength MPa | electrical conductivity % IACS |
|---|---|---|---|---|---|---|---|---|
| copper alloy powder A7 | 1.22 | 600 | 195.8 | none | 99.3 | 89.5 | 268.9 | 20.89 |
| | | | | 300 | | 92.3 | 286.9 | 23.16 |
| | | | | 400 | | 127.9 | 422.9 | 42.78 |
| | | | | 450 | | 214.2 | 635.8 | 59.28 |
| | | | | 500 | | 213.3 | 628.3 | 73.96 |
| | | | | 550 | | 169.8 | 519.6 | 82.26 |
| | | | | 600 | | 141.0 | 424.8 | 86.80 |
| | | | | 700 | | 96.8 | 298.6 | 90.05 |

As shown in Tables 8, 9 and 10, an additively-manufactured article composed of a copper alloy and having a Cr content of more than 1.00 mass % and not more than 2.80 mass % stably had a relative density of not less than 99% and not more than 100%. Furthermore, it is recognized that an additively-manufactured article heat-treated at a temperature of not lower than 300° C. tends to be significantly improved in mechanical strength and electrical conductivity.

Figure 9:
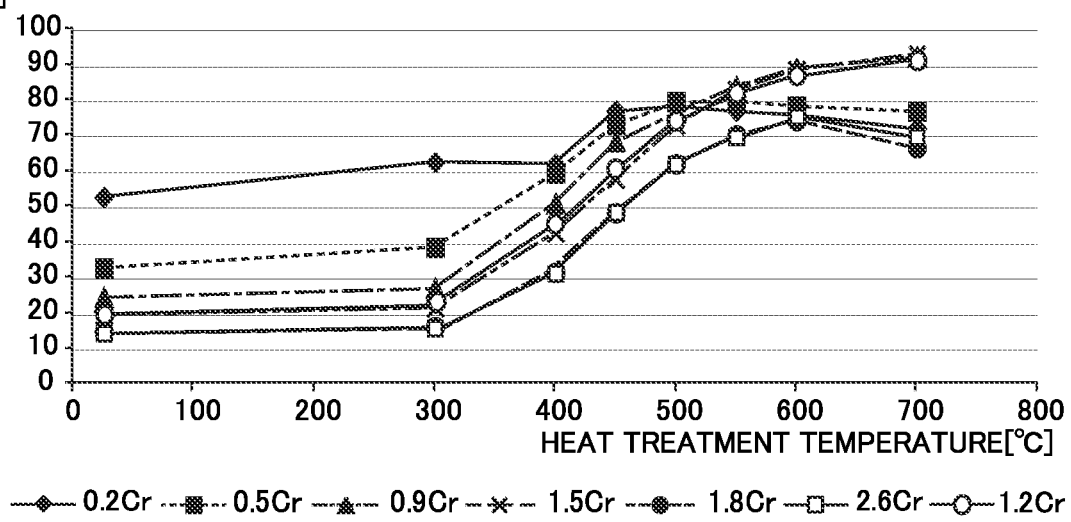
FIG. 9 is a graph representing a relationship between a heat treatment temperature of the third step and electrical conductivity.
Figure 10:
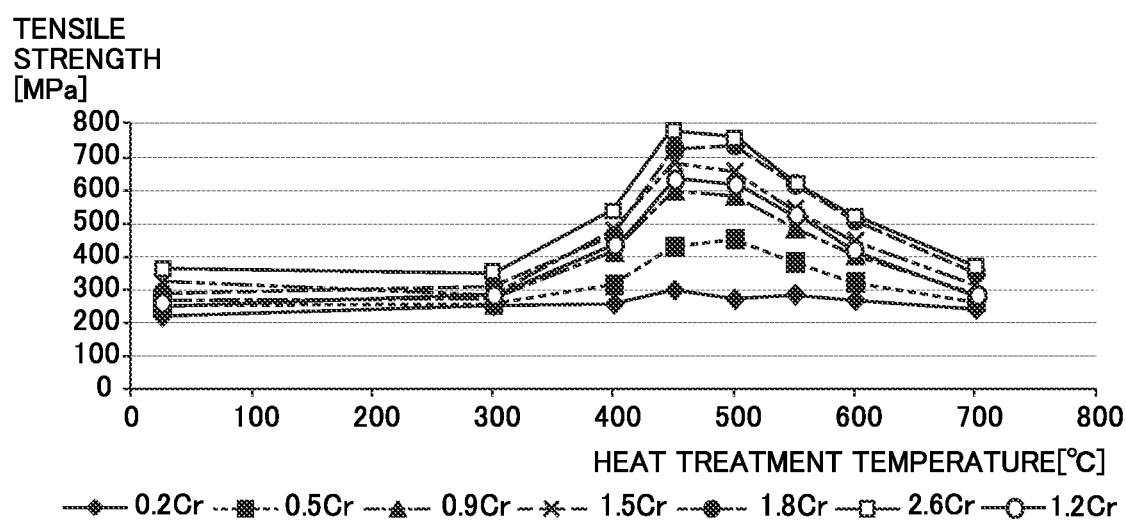
FIG. 10 is a graph representing a relationship between the heat treatment temperature of the third step and tensile strength.

Hereinafter, FIGS. 9-11 are used to describe the results. In FIGS. 9 to 11, for example, a legend "1.5 Cr" indicates a Cr content of 1.46 mass %. For the sake of convenience, each legend has a second decimal place rounded off. A graph is formed such that an additively-manufactured article which is not heat-treated is regarded as having been heat-treated at 25° C.

FIG. 9 is a graph representing a relationship between the heat treatment temperature of the third step and electrical conductivity. In a range in which the heat treatment temperature is not lower than 300° C., additively-manufactured articles are significantly improved in electrical conductivity. Even when the heat treatment temperature is 700° C., it is recognized that the articles are improved in electrical conductivity effectively. Thus the heat treating temperature's upper limit may be 700° C. However, it is expected that an electrical conductivity enhancement effect is also obtained even in a range in which the heat treatment temperature exceeds 700° C.

FIG. 10 is a graph representing a relationship between the heat treatment temperature of the third step and tensile strength. As shown in FIG. 10, in a range in which the heat treatment temperature is not lower than 300° C., additively-manufactured articles are significantly improved in tensile strength. The tensile strength is enhanced by a remarkably significant width when the heat treatment temperature is changed from 400° C. to 450° C. The tensile strength peaks around 500° C., and then gradually decreases.

FIG. 11 is a graph representing a relationship between the heat treatment temperature of the third step and Vickers hardness. The Vickers hardness also exhibits a tendency similar to that of the tensile strength.

From FIGS. 9 to 11, it is believed that from a viewpoint of a balance between mechanical strength and electrical conductivity, the heat treatment temperature may be not lower than 300° C. and not higher than 700° C., not lower than 400° C. and not higher than 600° C., not lower than 450° C. and not higher than 550° C., or may be not lower than 450° C. and not higher than 500° C.

It should be understood that the embodiments disclosed herein have been described for the purpose of illustration only and in a non-restrictive manner in any respect. The scope of the present invention is defined by the terms of the claims, rather than the description above, and is intended to include any modifications within the meaning and scope equivalent to the terms of the claims.

What is claimed is:

1. A method of using a copper alloy powder, the method comprising:
   preparing the copper alloy powder;
   using the copper alloy powder as a raw material for a laser, electron beam or plasma additively manufactured article; and
   heat-treating the laser, electron beam or plasma additively manufactured article such that the laser, electron beam or plasma additively manufactured article has an electrical conductivity of not less than 70% IACS,
   wherein
   the copper alloy powder is solidified into a predetermine shape by irradiating the copper alloy powder with at least one of the laser, the electron beam or the plasma,
   the copper alloy powder consists of
   more than 1.00 mass % and not more than 2.80 mass % of chromium;
   optionally oxygen in an impurity content; and
   a balance of copper.

2. The method of using a copper alloy powder according to claim 1, wherein
   the copper alloy powder contains more than 1.05 mass % and not more than 2.80 mass % of chromium.

3. The method of using a copper alloy powder according to claim 1, wherein
   the copper alloy powder contains more than 1.00 mass % and not more than 2.00 mass % of chromium.

4. The method of using a copper alloy powder according to claim 3, wherein
   the copper alloy powder contains more than 1.05 mass % and not more than 2.00 mass % of chromium.

5. The method of using a copper alloy powder according to claim 1, wherein
   the copper alloy powder contains not less than 1.46 mass % and not more than 2.80 mass % of chromium.

6. The method of using a copper alloy powder according to claim 1, wherein
the copper alloy powder contains more than 1.00 mass % and not more than 1.22 mass % of chromium.

* * * * *